United States Patent
Kimura

(10) Patent No.: US 11,376,894 B2
(45) Date of Patent: Jul. 5, 2022

(54) MANAGEMENT SYSTEM FOR TIRES FOR CONSTRUCTION AND MINE VEHICLES AND MANAGEMENT METHOD FOR TIRES FOR CONSTRUCTION AND MINE VEHICLES

(71) Applicant: BRIDGESTONE CORPORATION, Tokyo (JP)

(72) Inventor: Takeshi Kimura, Kawasaki (JP)

(73) Assignee: BRIDGESTONE CORPORATION, Tokyo (JP)

( * ) Notice: Subject to any disclaimer, the term of this patent is extended or adjusted under 35 U.S.C. 154(b) by 269 days.

(21) Appl. No.: 16/771,217

(22) PCT Filed: Jul. 20, 2018

(86) PCT No.: PCT/JP2018/027348
§ 371 (c)(1),
(2) Date: Jun. 10, 2020

(87) PCT Pub. No.: WO2019/116624
PCT Pub. Date: Jun. 20, 2019

(65) Prior Publication Data
US 2021/0146730 A1    May 20, 2021

(30) Foreign Application Priority Data
Dec. 14, 2017  (JP) .............................. JP2017-240072

(51) Int. Cl.
*B60C 11/24* (2006.01)
*G07C 5/08* (2006.01)

(52) U.S. Cl.
CPC .......... *B60C 11/246* (2013.01); *G07C 5/0808* (2013.01)

(58) Field of Classification Search
CPC ..... B60C 11/246; B60C 23/20; G07C 5/0808; G01L 17/00; B60S 5/00; G01B 11/22; G01M 17/02
See application file for complete search history.

(56) References Cited

U.S. PATENT DOCUMENTS

| 2006/0152352 A1 | 7/2006 | Moughler |
| 2010/0319446 A1 | 12/2010 | Coue |

(Continued)

FOREIGN PATENT DOCUMENTS

| EP | 2623343 A1 | 8/2013 |
| JP | 2003159918 A | 6/2003 |

(Continued)

OTHER PUBLICATIONS

Jun. 15, 2021, search result of the Extended European Search Report issued by the European Patent Office in the corresponding European Patent Application No. 18889566.8.

(Continued)

*Primary Examiner* — Joseph J Dallo
(74) *Attorney, Agent, or Firm* — Kenja IP Law PC

(57) ABSTRACT

A management system for tires for construction and mine vehicles comprises: a fatigue degree calculation section; a grouping processing section configured to group a plurality of front tires into a plurality of fatigue degree groups depending on calculated fatigue degrees; and an assignment processing section configured to assign front tires belonging to a fatigue degree group as rear tires of a vehicle after rotation. A management method for tires for construction and mine vehicles comprises: a fatigue degree calculation step; a grouping step of grouping a plurality of front tires into a plurality of fatigue degree groups depending on calculated fatigue degrees; and an assignment step of assign- (Continued)

ing front tires belonging to a fatigue degree group as rear tires of a vehicle after rotation.

4 Claims, 7 Drawing Sheets

(56) References Cited

U.S. PATENT DOCUMENTS

| | | | |
|---|---|---|---|
| 2014/0067193 A1 | 3/2014 | Gokyu et al. | |
| 2016/0247329 A1 | 8/2016 | Lavoie | |
| 2017/0343452 A1 | 11/2017 | Kitora | |
| 2019/0232968 A1 * | 8/2019 | Reynolds | A61B 5/1071 |

FOREIGN PATENT DOCUMENTS

| | | | | |
|---|---|---|---|---|
| JP | 3110243 U | 6/2005 | | |
| JP | 2006010378 A | 1/2006 | | |
| JP | 2010506787 A | 3/2010 | | |
| JP | 2013169816 A | 9/2013 | | |
| JP | 2014046879 A | 3/2014 | | |
| JP | 2017156295 A | 9/2017 | | |
| WO | WO-2005016728 A1 * | 2/2005 | ............. | B62D 61/10 |
| WO | WO-2005016731 A1 * | 2/2005 | ............. | B62D 61/10 |
| WO | WO-2005019331 A1 * | 3/2005 | ........... | B60C 1/0016 |
| WO | WO-2005054007 A1 * | 6/2005 | ................ | B60P 1/16 |
| WO | WO-2009016284 A2 * | 2/2009 | ............. | B62M 6/20 |
| WO | WO-2010081850 A1 * | 7/2010 | ............ | B60P 1/4421 |
| WO | 2016084376 A1 | 6/2016 | | |
| WO | WO-2019116624 A1 * | 6/2019 | ........... | B60C 11/246 |

OTHER PUBLICATIONS

Jun. 16, 2020, International Preliminary Report on Patentability issued in the International Patent Application No. PCT/JP2018/027348.

Sep. 25, 2018, International Search Report issued in the International Patent Application No. PCT/JP2018/027348.

* cited by examiner

MANAGEMENT SYSTEM FOR TIRES FOR CONSTRUCTION AND MINE VEHICLES AND MANAGEMENT METHOD FOR TIRES FOR CONSTRUCTION AND MINE VEHICLES

TECHNICAL FIELD

The present disclosure relates to a management system for tires for construction and mine vehicles and a management method for tires for construction and mine vehicles.

BACKGROUND

For tires for construction and mine vehicles, given heavy loads on the front wheels, the following technique is used: When the measured fatigue degrees of the front wheels reach a predetermined fatigue degree, the front tires are rotated to the rear, and new tires are mounted as the front tires. The fatigue degree of a tire can be measured by various methods (for example, see PTL 1).

CITATION LIST

Patent Literature

PTL 1: JP 2010-506787 A

SUMMARY

Technical Problem

With the foregoing technique, however, there are instances where some tires fail early after rotation and thus long-term efficient use of tires cannot be achieved.

It could therefore be helpful to provide a management system for tires for construction and mine vehicles and a management method for tires for construction and mine vehicles that enable long-term efficient use of tires.

Solution to Problem

We provide the following:

A management system for tires for construction and mine vehicles according to the present disclosure comprises: a fatigue degree calculation section configured to calculate a fatigue degree of each of a plurality of front tires installed in a plurality of vehicles; a grouping processing section configured to group the plurality of front tires into a plurality of fatigue degree groups depending on calculated fatigue degrees; and an assignment processing section configured to assign, from among the plurality of front tires grouped, front tires belonging to a fatigue degree group as rear tires of a vehicle after rotation.

Advantageous Effect

It is therefore possible to provide a management system for tires for construction and mine vehicles and a management method for tires for construction and mine vehicles that enable long-term efficient use of tires.

DETAILED DESCRIPTION

One of the disclosed embodiments will be described in detail below, with reference to the drawings.

<Management System for Tires for Construction and Mine Vehicles>

Figure 1:
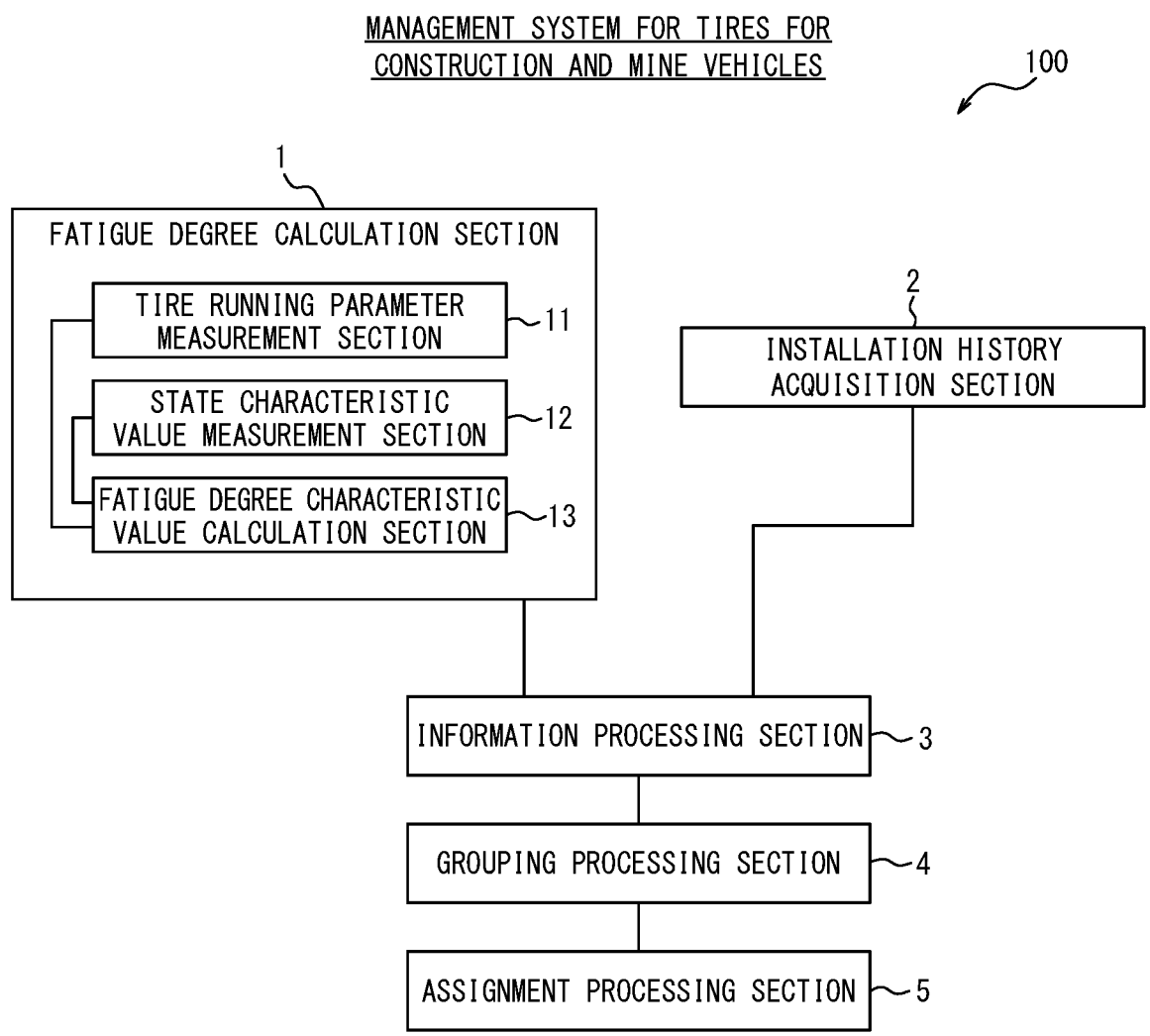
FIG. 1 is a block diagram of a management system for tires for construction and mine vehicles according to one of the disclosed embodiments.

FIG. 1 is a block diagram of a management system for tires for construction and mine vehicles (hereafter also simply referred to as "tire management system") according to one of the disclosed embodiments. As illustrated in FIG. 1, a tire management system 100 includes a fatigue degree calculation section 1, an installation history acquisition section 2, an information processing section 3, a grouping processing section 4, and an assignment processing section 5.

The fatigue degree calculation section 1 is configured to calculate a fatigue degree of each of a plurality of front tires, and includes a processor capable of calculating the fatigue degree. In this embodiment, the fatigue degree calculation section 1 includes a tire running parameter measurement section 11, a state characteristic value measurement section 12, and a fatigue degree characteristic value calculation section 13, as illustrated in FIG. 1.

The tire running parameter measurement section 11 is configured to measure a tire running parameter. Examples of the tire running parameter include the running time, running distance (for example, GPS records are used), remaining groove depth (remaining tread depth: RTD), and number of revolutions of the tire. The tire running parameter is preferably the running time or running distance of the tire. The tire running parameter measurement section 11 may be, for example, a known device capable of measuring the running time and/or distance of the tire by detecting revolutions of the tire.

The state characteristic value measurement section 12 is configured to measure a state characteristic value indicating the state of each tire constituent member. Examples of tire constituent members include a bead, a carcass, a belt, and a tread rubber. The state characteristic value indicating the state of each tire constituent member is, for example, the temperature of the tire constituent member. For example, the temperature of the tire constituent member can be obtained as follows: The state characteristic value measurement section 12 (for example, a known thermometer) is installed inside the chamber (the space between the tire inner surface and the rim wheel), the temperature inside the chamber is measured, and the temperature of the tire constituent member is calculated by converting the measured temperature inside the chamber. For example, the temperature of each of the tread, the belt, the bead, etc. can be calculated by adding a predetermined constant based on past data and the like to the measured temperature inside the chamber.

Herein, "measuring" means that the tire running parameter or the state characteristic value can be obtained directly or indirectly. That is, the term "measuring" includes obtaining the tire running parameter or the state characteristic value as a result of performing some kind of calculation on a directly measured parameter or the like.

The fatigue degree characteristic value calculation section 13 is configured to calculate a fatigue degree characteristic value corresponding to the fatigue degree of each tire constituent member, based on the tire running parameter measured by the tire running parameter measurement section 11 and the state characteristic value measured by the state characteristic value measurement section 12. In this embodiment, the fatigue degree characteristic value calculation section 13 calculates, as the fatigue degree characteristic value, a thermal history by integrating the temperature measured by the state characteristic value measurement section 12 with the tire running time measured by the tire running parameter measurement section 11. The reason that the thermal history is used as the fatigue degree characteristic value corresponding to the fatigue degree of the tire constituent member is because the thermal history is a good index when predicting the failure risk of the tire constituent member.

Although the foregoing thermal history is used as an index of the fatigue degree in this embodiment, the present disclosure is not limited to such. For example, not the integral but the product of the temperature measured by the state characteristic value measurement section 12 at one point in time and the running distance at the point in time may be used as the fatigue degree. Alternatively, the fatigue degree may be, for example, TKPH (the multiplication value of the load (average load) on the tire and the speed (average speed)) or $T^2KPH$ (the multiplication value of the square of the load (average load square) on the tire and the speed (average speed)). In this case, the fatigue degree calculation section 1 may include a measuring instrument configured to measure the load on the tire and a storage section configured to store the load on the tire, and a measuring instrument configured to measure the speed and a storage section configured to store the speed.

The installation history acquisition section 2 is configured to acquire, for each of a plurality of front tires installed at respective positions in a plurality of vehicles, information of the vehicle and the position at which the front tire is installed. For example, the installation history acquisition section 2 acquires, for each tire, information of a combination of: a tire serial number; and an installation vehicle ID and an installation position ID. Herein, the term "position" means, for example in the case of two front wheels and four rear wheels, any of the following positions: front left wheel, front right wheel, rear left outer wheel, rear left inner wheel, rear right inner wheel, and rear right outer wheel. For example, the installation history acquisition section 2 may include a storage section, and store a position ID upon tire replacement. Alternatively, the installation history acquisition section 2 may include a communication section such as GPS, and acquire information of the vehicle and the position by the communication section and store the information in a storage section.

The information processing section 3 is a processor configured to perform a process of associating the calculated fatigue degree and the acquired information of the vehicle and the position. By this information processing, information of the fatigue degree of a tire installed at a specific position in a vehicle used in a specific use condition can be obtained. For example, the fatigue degree (e.g. thermal history) of a tire installed on the front left wheel of a specific vehicle used in a severe (e.g. high speed) use condition can be obtained.

The grouping processing section 4 is configured to group the plurality of front tires into a plurality of fatigue degree groups depending on the calculated fatigue degrees. For tires for construction and mine vehicles, the tire life on the front wheels tends to be short. Accordingly, front tires are subjected to grouping. For example, a predetermined fatigue degree threshold may be set to group the plurality of front tires into a group of tires each having a fatigue degree greater than or equal to the threshold and a group of tires each having a fatigue degree less than the threshold. Two or more thresholds may be set to group the plurality of front tires into three or more groups.

The assignment processing section 5 is configured to assign, from among the plurality of front tires grouped, front tires belonging to a fatigue degree group as rear tires of a vehicle after rotation.

In the tire management system 100 according to this embodiment, the assignment processing section 5 is further configured to assign new tires as all front tires of the vehicle after the rotation.

The effects of this embodiment will be described below.

Figure 2:
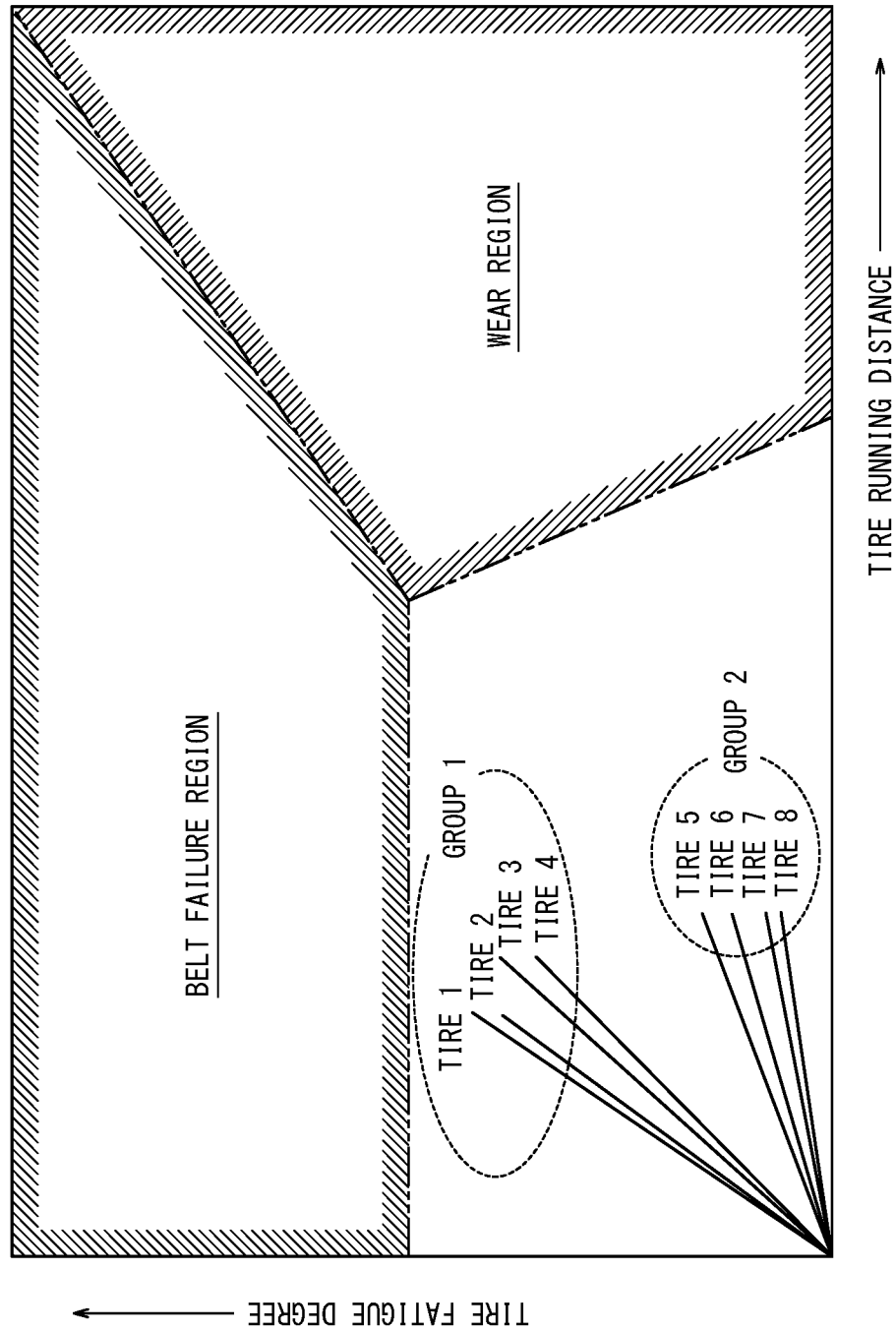
FIG. 2 is a diagram illustrating the relationship between the tire running distance and the tire fatigue degree on the one hand, and a belt failure region and a wear region on the other hand, before rotation.
Figure 3:
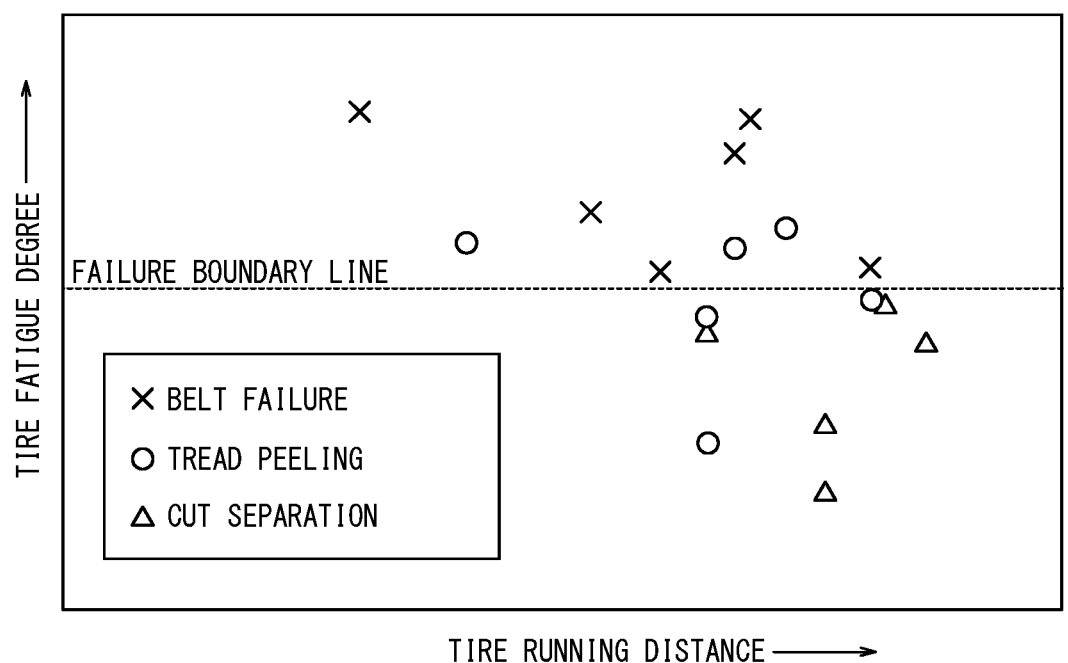
FIG. 3 is a diagram illustrating the relationship between the tire running distance and the tire fatigue degree on the one hand, and each type of failure on the other hand.
Figure 4:
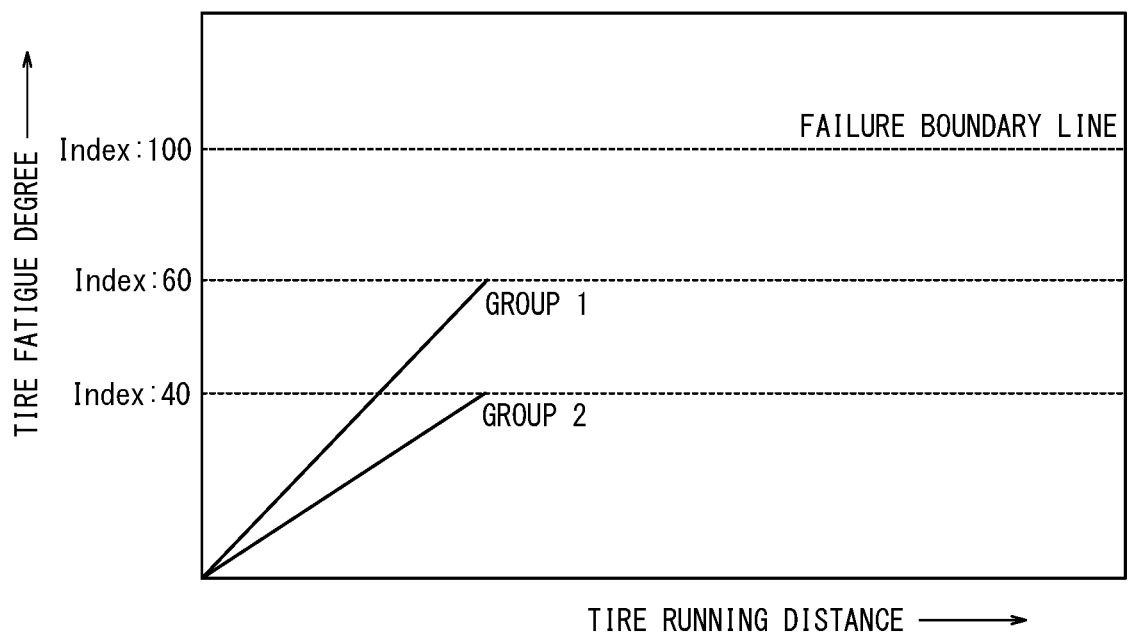
FIG. 4 is a diagram illustrating the relationship between the tire running distance and the tire fatigue degree of the tires of each of groups 1 and 2 illustrated in FIG. 2.

FIG. 2 is a diagram illustrating the relationship between the tire running distance (an example of the tire running parameter) and the tire fatigue degree on the one hand, and a belt failure region and a wear region on the other hand, before rotation. FIG. 3 is a diagram illustrating the relationship between the tire running distance (an example of the tire running parameter) and the tire fatigue degree on the one hand, and each type of failure on the other hand. For example, a failure boundary line can be set at a region in which the risk of belt failures arises, as illustrated in FIG. 3. FIG. 4 is a diagram illustrating the relationship between the tire running distance and the tire fatigue degree of the tires of each of groups 1 and 2 illustrated in FIG. 2.

In the example illustrated in FIG. 2, the plurality of front tires are grouped into a group (group 1) of front tires each having a high fatigue degree and a group (group 2) of front tires each having a lower fatigue degree than the group 1. As illustrated in FIG. 4, too, the tires of the group 1 are higher in fatigue degree than the tires of the group 2 at the same running distance (in this example, at a given tire running distance, the index of the fatigue degree of the group 1 reaches 60 whereas the index of the fatigue degree of the group 2 reaches only 40). Without the foregoing assignment, the tires of the group 2 are likely to reach the wear region (the region in which tires can be used up safely) after being rotated from the front wheels to the rear wheels, but the tires of the group 1 are likely to reach the belt failure region (the region in which the risk of belt failures arises) without reaching the wear region after being rotated from the front wheels to the rear wheels and consequently, for example, need to be replaced. Besides, the tires of the group 2 are likely to reach the wear region with an excessive allowance (for example, the use of the tires in a mild (e.g. low speed) condition more than necessary is continued). Thus, the tires are not used sufficiently effectively.

In view of this, the tire management system according to this embodiment includes: the fatigue degree calculation section 1 configured to calculate the fatigue degree of each of a plurality of front tires installed in a plurality of vehicles; the grouping processing section 4 configured to group the plurality of front tires into a plurality of fatigue degree groups depending on the calculated fatigue degrees; and the assignment processing section 5 configured to assign, from among the plurality of front tires grouped, front tires belonging to a fatigue degree group as rear tires of a vehicle after rotation. Therefore, for example, the use condition of the vehicle can be determined depending on the fatigue degree of the front tires belonging to the fatigue degree group (for example, in the case where the fatigue degree is high, the tires are used in a milder condition such as lower speed or lower load after rotation).

Figure 5:
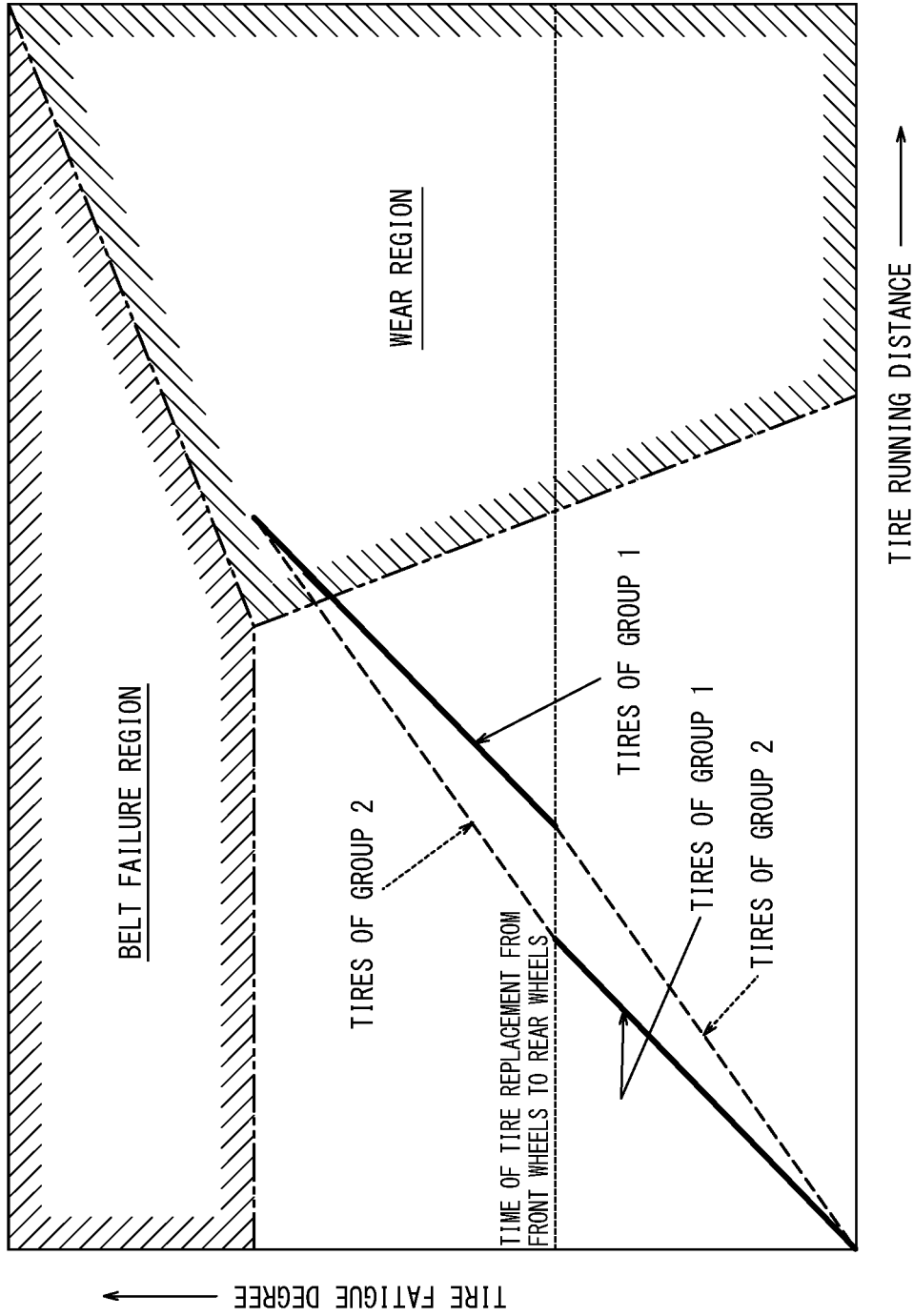
FIG. 5 is a diagram illustrating the relationship between the tire running distance and the tire fatigue degree on the one hand, and the belt failure region and the wear region on the other hand, before and after rotation.

FIG. 5 is a diagram illustrating the relationship between the tire running distance (an example of the tire running parameter) and the tire fatigue degree on the one hand, and the belt failure region and the wear region on the other hand, before and after rotation. As illustrated in FIG. 5, the tires of the group 1 and the tires of the group 2 can both reach the wear region without reaching the belt failure region after being rotated from the front wheels to the rear wheels, and also the tires of the group 1 and the tires of the group 2 can both reach the wear region near the boundary between the belt failure region and the wear region. The tires can thus be used effectively.

As described above, the management system for tires for construction and mine vehicles according to this embodiment enables long-term efficient use of tires.

In the management system for tires for construction and mine vehicles according to the present disclosure, the rotation processing section 5 is preferably further configured to assign new tires as all front tires of the vehicle after the rotation, as in this embodiment.

For tires for construction and mine vehicles, the use condition of the front wheels is more severe than the use condition of the rear wheels, as mentioned earlier. Hence, assigning and using new tires as the front wheels after the rotation can further contribute to long-term efficient use of tires.

Figure 6:
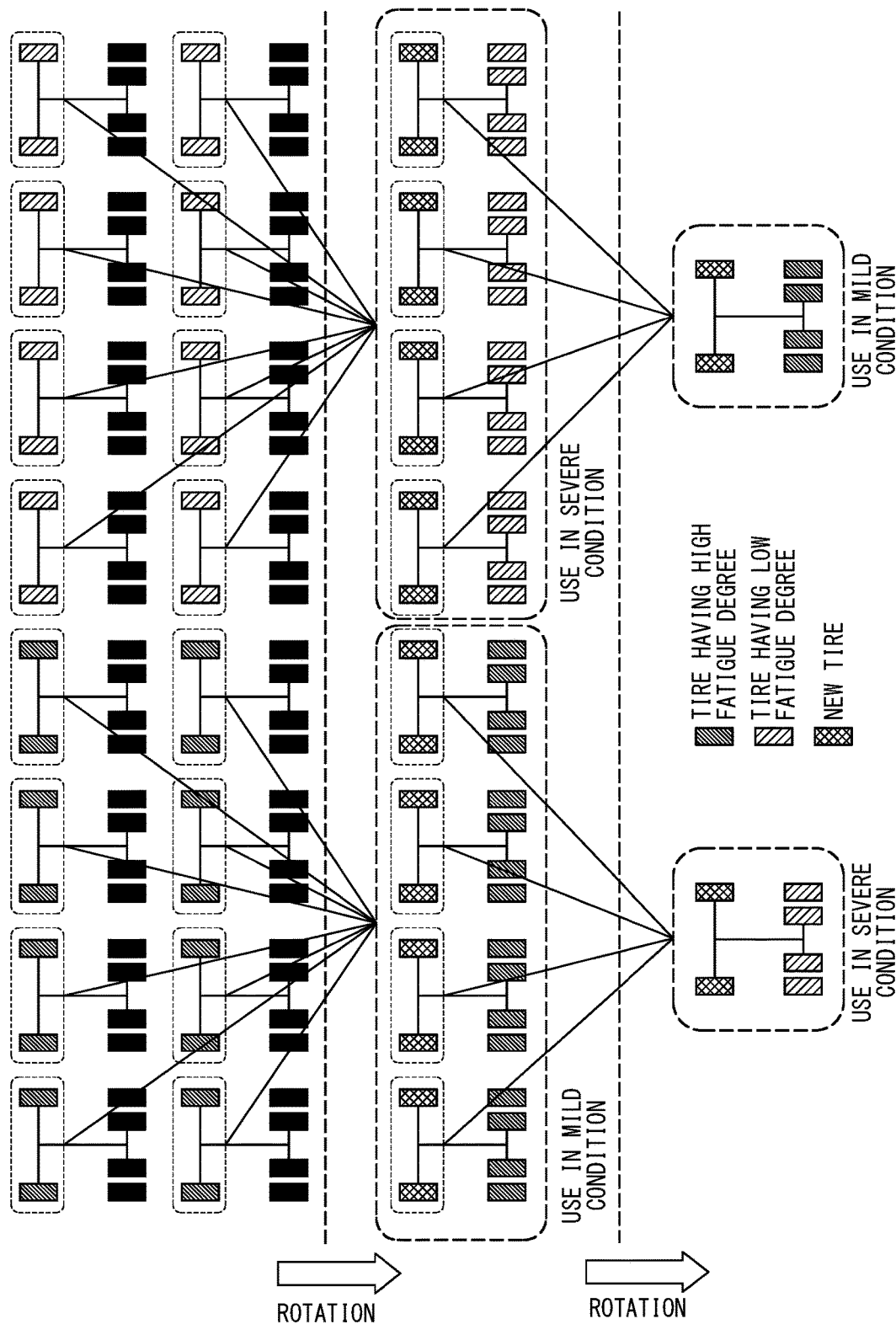
FIG. 6 is a schematic diagram for explaining tire management (tire rotation) according to one of the disclosed embodiments.

FIG. 6 is a schematic diagram for explaining tire management (tire rotation) according to one of the disclosed embodiments. FIG. 6 illustrates the case where rotation is performed twice. Before the first rotation, tires are installed at respective positions (front left tire, front right tire, rear left outer tire, rear left inner tire, rear right outer tire, and rear right inner tire) in each of sixteen vehicles. In this example, the fatigue degree calculation section 1 groups sixteen front tires as a fatigue degree group having a high fatigue degree and the remaining sixteen front tires as a fatigue degree group having a low fatigue degree, as illustrated in FIG. 6.

As illustrated in FIG. 6, the tires grouped as the fatigue degree group having a high fatigue degree are assigned as the rear wheels of vehicles (a total of sixteen rear wheels of four vehicles) after the first rotation (before the second rotation). Then, for example, the use condition can be determined as mild (low speed, low load, etc.). Meanwhile, the tires grouped as the fatigue degree group having a low fatigue degree are assigned as the rear wheels of vehicles (a total of sixteen rear wheels of four vehicles) after the first rotation (before the second rotation). Then, for example, the use condition can be determined as severe (high speed, high load, etc.). In this example, the front wheels are all replaced with new tires.

Before the second rotation, fatigue degree calculation and grouping are performed again. In this example, the fatigue degree calculation section 1 groups eight front tires as a fatigue degree group having a high fatigue degree, and the remaining eight front tires as a fatigue degree group having a low fatigue degree. The tires grouped as the fatigue degree group having a high fatigue degree are assigned as the rear wheels of vehicles (eight rear wheels of two vehicles) after the second rotation. Then, for example, the use condition can be determined as mild (low speed, low load, etc.). Meanwhile, the tires grouped as the fatigue degree group having a low fatigue degree are assigned as the rear wheels of vehicles (eight rear wheels of two vehicles) after the second rotation. Then, for example, the use condition can be determined as severe (high speed, high load, etc.). In this example, the front wheels are all replaced with new tires.

By repeating this, long-term efficient use of tires can be achieved.

<Management Method for Tires for Construction and Mine Vehicles>

Figure 7:
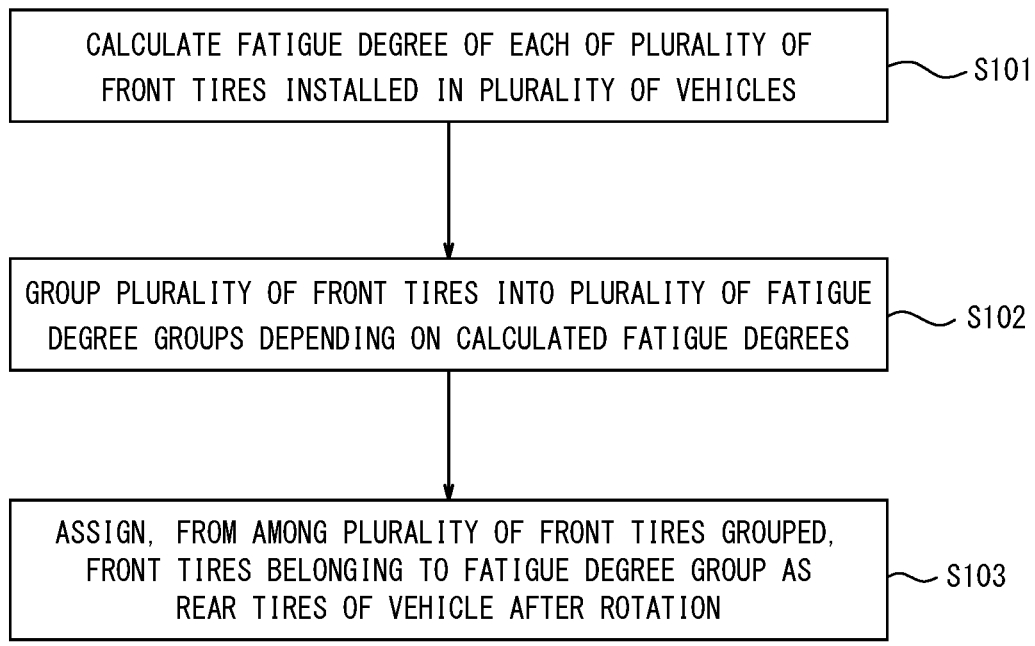
FIG. 7 is a flowchart of a management method for tires for construction and mine vehicles according to one of the disclosed embodiments.

FIG. 7 is a flowchart of a management method for tires for construction and mine vehicles (hereafter also simply referred to as "tire management method") according to one of the disclosed embodiments.

As illustrated in FIG. 7, in this embodiment, a fatigue degree of each of a plurality of front tires installed in a plurality of vehicles is calculated first (fatigue degree calculation step: step S101). The fatigue degree calculation step can be performed by the fatigue degree calculation section 1, as described above. As the fatigue degree, any of various indexes such as the foregoing thermal history, product of temperature and running distance, TKPH, and $T^2KPH$ may be used, as mentioned earlier. As an example, in the case where the thermal history is used as an index of the fatigue degree, the fatigue degree calculation step may include: a step of measuring the foregoing tire running parameter by the tire running parameter measurement section 11; a step of measuring the foregoing state characteristic value indicating the state of each tire constituent member by the state characteristic value measurement section 12; and a step of calculating, by the fatigue degree characteristic value calculation section 13, a fatigue degree characteristic value corresponding to the fatigue degree of each tire constituent member based on the tire running parameter measured by the tire running parameter measurement section 11 and the state characteristic value measured by the state characteristic value measurement section 12.

Next, as illustrated in FIG. 7, the plurality of front tires are grouped into a plurality of fatigue degree groups depending on the calculated fatigue degrees (grouping step: step S102). The grouping step can be performed by the grouping processing section 4, as described above. For example, in this step, a predetermined fatigue degree threshold may be set to group the plurality of front tires into a group of tires each having a fatigue degree greater than or equal to the threshold and a group of tires each having a fatigue degree less than the threshold, as mentioned earlier. Two or more thresholds may be set to group the plurality of front tires into three or more groups.

Next, as illustrated in FIG. 7, from among the plurality of front tires grouped, front tires belonging to a fatigue degree group are assigned as rear tires of a vehicle after rotation (assignment step: step S103). The assignment step can be performed by the assignment processing section 5, as described above.

In this embodiment, the assignment step (step S103) includes assigning new tires as all front tires of the vehicle after the rotation.

The effects of the management method for tires for construction and mine vehicles according to this embodiment will be described below.

The tire management method according to this embodiment comprises: the fatigue degree calculation step (step S101) of calculating the fatigue degree of each of a plurality of front tires installed in a plurality of vehicles; the grouping step (step S102) of grouping the plurality of front tires into a plurality of fatigue degree groups depending on the calculated fatigue degrees; and the assignment step (step S103) of assigning, from among the plurality of front tires grouped, front tires belonging to a fatigue degree group as rear tires of a vehicle after rotation. Therefore, for example, the use condition of the vehicle can be determined depending on the fatigue degree of the front tires belonging to the fatigue degree group (for example, in the case where the fatigue degree is high, the tires are used in a milder condition such as lower speed or lower load after rotation).

Thus, as illustrated in FIG. 5, the tires of the group 1 and the tires of the group 2 can both reach the wear region without reaching the belt failure region after being rotated from the front wheels to the rear wheels, and also the tires of the group 1 and the tires of the group 2 can both reach the wear region near the boundary between the belt failure region and the wear region. The tires can thus be used effectively.

As described above, the management method for tires for construction and mine vehicles according to this embodiment enables long-term efficient use of tires.

In the management method for tires for construction and mine vehicles according to the present disclosure, the assignment step (step S103) preferably includes assigning new tires as all front tires of the vehicle after the rotation.

For tires for construction and mine vehicles, the use condition of the front wheels is more severe than the use condition of the rear wheels, as mentioned earlier. Hence, assigning and using new tires as the front wheels after the rotation can further contribute to long-term efficient use of tires.

While one of the disclosed embodiments has been described above, the management system for tires for construction and mine vehicles and the management method for tires for construction and mine vehicles according to the present disclosure are not limited to the foregoing embodiment. For example, various indexes can be used as the fatigue degree, as mentioned earlier. For example, in the case where temperature is used as an index or used in index calculation, the temperature may be measured by any known thermometer, and the calculation may be performed using any known calculator. In the case where the tire running parameter (e.g. the running time, running distance, remaining groove depth (remaining tread depth: RTD), and number of revolutions of the tire) is used as an index of the fatigue degree or used in index calculation, the tire running parameter may be obtained using, for example, any known measuring instrument described above.

Although the foregoing embodiment describes the case where a plurality of front tires are grouped into two fatigue degree groups, the number of groups may be two or more.

For example, in the case of grouping the plurality of front tires into five groups, the assignment processing section 5 may assign, from among the plurality of front tires grouped into the five groups, front tires belonging to a fatigue degree group as rear tires of a vehicle after rotation. Then, for example, tires assigned as a group having the highest fatigue degree of the five groups may be used in the mildest use condition after rotation, tires assigned as a group having the second highest fatigue degree may be used in the second mildest use condition after rotation, tires assigned as a group having the third highest fatigue degree may be used in the third mildest use condition after rotation, tires assigned as a group having the fourth highest fatigue degree may be used in the fourth mildest use condition after rotation, and tires assigned as a group having the lowest fatigue degree may be used in the most severe use condition after rotation.

Moreover, in the present disclosure, steps S101 to S103 may be repeated depending on the number of rotations.

REFERENCE SIGNS LIST 1 fatigue degree calculation section
11 tire running parameter measurement section
12 state characteristic value measurement section
13 fatigue degree characteristic value calculation section
2 installation history acquisition section
3 information processing section
4 grouping processing section
5 assignment processing section
100 management system for tires for construction and mine vehicles

The invention claimed is:

1. A management system for tires for construction and mine vehicles, comprising:
   a fatigue degree calculation section configured to calculate a fatigue degree of each of a plurality of front tires installed in a plurality of vehicles;
   a grouping processing section configured to group the plurality of front tires into a plurality of fatigue degree groups depending on calculated fatigue degrees; and
   an assignment processing section configured to assign, from among the plurality of front tires grouped, front tires belonging to a fatigue degree group as rear tires of a vehicle after rotation.

2. The management system for tires for construction and mine vehicles according to claim 1, wherein the assignment processing section is further configured to assign new tires as all front tires of the vehicle after the rotation.

3. A management method for tires for construction and mine vehicles, comprising:
   calculating, by a fatigue degree calculation section, a fatigue degree of each of a plurality of front tires installed in a plurality of vehicles;
   grouping, by a grouping processing section, the plurality of front tires into a plurality of fatigue degree groups depending on calculated fatigue degrees; and
   assigning, by an assignment processing section, from among the plurality of front tires grouped, front tires belonging to a fatigue degree group as rear tires of a vehicle after rotation.

4. The management method for tires for construction and mine vehicles according to claim 3, wherein the assigning further includes assigning new tires as all front tires of the vehicle after the rotation.

\* \* \* \* \*